July 10, 1923.
J. P. SCHUCKMAN
ANIMAL TRAP
Filed Feb. 27, 1922
1,461,681
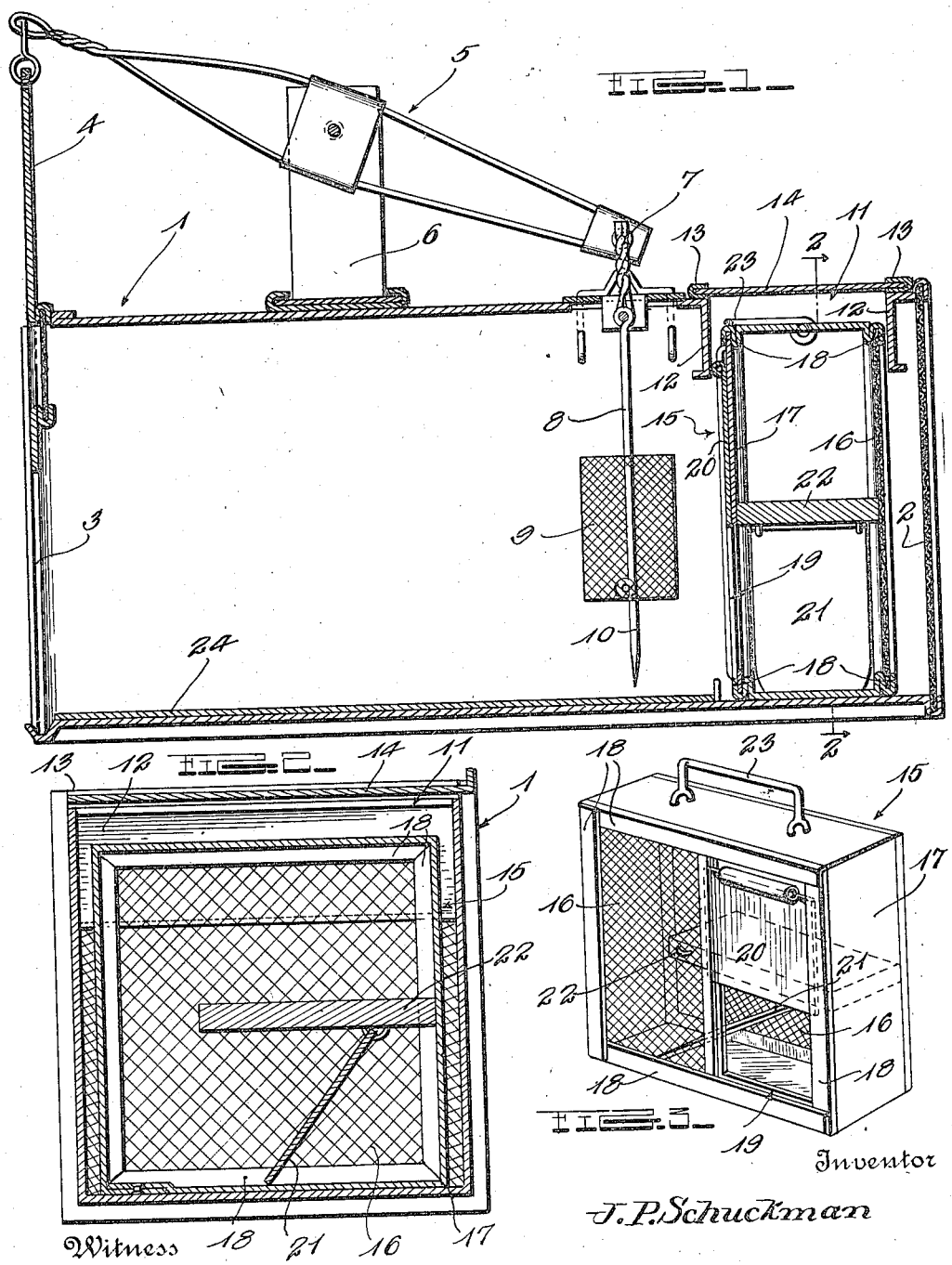
Witness
George H. Giovanetti
Inventor
J. P. Schuckman
By H. A. Wilson &co.
Attorneys Patented July 10, 1923.

1,461,681

UNITED STATES PATENT OFFICE.

JOHN P. SCHUCKMAN, OF WICHITA, KANSAS.

ANIMAL TRAP.

Application filed February 27, 1922. Serial No. 539,545.

*To all whom it may concern:*

Be it known that I, JOHN P. SCHUCKMAN, a citizen of the United States, residing at Wichita, in the county of Sedgwick and State of Kansas, have invented certain new and useful Improvements in Animal Traps; and I do declare the following to be a full, clear, and exact description of the invention, such as will enable others skilled in the art to which it appertains to make and use the same.

This invention relates to an improved animal trap which is especially, but not necessarily, designed for catching rats and other small animals, although it is adaptable for catching birds, rabbits and the like. The principal object of the invention is to generally improve upon my patented trap bearing No. 1,255,798, the same having been granted to me on February 5, 1918.

Actual use of my patented traps has continuously disclosed the fact that they are not altogether advantageous in all respects because they are of such size that they cannot be conveniently used in restricted and small spaces. This is due in one respect to the employment of the exteriorly disposed detachable animal-receiving cage which is arranged alongside of the main compartment or trap.

To overcome the disadvantage just pointed out and in order to produce an extremely novel and compact trap capable of use in much smaller spaces, I have conceived of the idea of using a small cage and placing the same within the main compartment.

One very important feature and advantage of the improved trap is that the main compartment is in the form of an elongated sheet metal box open at one end and closed at its opposite end by openwork means to permit passage of the light, there being a gravity-lowered and animal-tripped door cooperative with the open end and the cage being located at the opposite end and so designed as to permit passage of light to induce the animal to enter the cage.

A further object of the invention is to form the main compartment or trap in one side with an opening through which the cage is designed to be inserted and removed there being a closure supplied for this opening which permits independent use of the trap when the cage is removed.

A still further object of the invention is to generally improve upon prior patented and marketed traps, by producing one of extreme simplicity and durability, which is such in construction as to permit other advantages and features, to be hereinafter described, to be accomplished.

In the accompanying drawings forming a part of this specification and in which like numerals are employed to designate like parts throughout the same;

Figure 1 is a central longitudinal sectional view through a trap constructed in accordance with this invention.

Figure 2 is a transverse section taken on the line 2—2 of Fig. 1.

Figure 3 is a detail perspective view of the removable cage.

Referring to the drawings in detail, the numeral 1 designates generally an elongated sheet metal box which may be conveniently termed the main compartment or trap, the same being open at one end and closed by a screen 2 or other openwork means at its opposite end. At the first named end are spaced vertically disposed guides 3 in which a gravity-lowered door or closure 4 is slidably mounted. This closure is normally held elevated by a novel animal-actuated means which in the showing comprises a suitably designed lever or beam 5 pivoted intermediate its ends on uprights 6 mounted on the top of the trap. At its forward end, the lever is pivotally connected with the aforesaid closure, and its opposite end is provided with a laterally disposed roller 7 with which the laterally directed upper end of a pivotally mounted trip 8 co-acts. As shown in my patented trap, this trip carries a bait-receiving basket 9 and as improved, the lower end of the trip extends a considerable distance below the basket as indicated at 10 so that its extremity terminates comparatively close to the bottom of the trap, making it almost impossible for the animal to approach this end of the trap without actuating the trip. The mounting means for the trip is identical with that disclosed in my patent and it is therefore unnecessary to further describe the trap or main compartment in detail with the exception of pointing out that it is provided in its top with a transversely disposed opening 11 which serves a purpose hereinafter described. It is to be noted that in forming the opening, the metal is simply struck inward to provide a pair of spaced depending guide flanges 12 which also serve a purpose to be hereinafter described. Mounted on opposite sides of the opening 11 are guides 13 in which a closure 14 is slidably mounted.

The description so far as it has gone, has merely set forth a trap or main compartment constructed in substantially the same manner as the one shown in the aforementioned patent, with the exception that the trap is not formed entirely of a wire mesh and it is equipped in its top with an opening for co-action with the removable animal-receiving cage generally designated by the numeral 15. As before intimated, this cage is designed to be inserted and removed through the opening 11 and when in position, its upper portion co-acts with the guide flanges 12 so as to prevent displacement of the cage and to facilitate its insertion. Although the cage could be constructed otherwise, it is preferably in the form of a relatively small square container embodying opposed screens 16 secured to a metal frame 17 constructed to provide a plurality of laterally disposed flanges 18. In one side, an opening 19 is provided and a slidable closure 20 is employed for closing this opening when the cage is removed. Inside of the cage is a pivotally mounted plate 21 which extends diagonally across the inlet opening 19 and it is obvious that when the animal passes through this opening and lifts the free lower end of the plate, the latter will drop by gravity and prevent the animal from returning through the opening. Arranged between the top and bottom of the cage is a horizontally disposed wooden shelf 22 on which the animal is designed to jump to overcome a disadvantage to be later described. This shelf terminates in spaced relation from one of the vertical ends of the aforesaid frame so as to provide sufficient space to permit the animal to jump onto the shelf. For the convenience of handling, the cage is provided with a suitable handle 23.

It has been discovered that when a rat or the like treads upon cold metal his body becomes charged to a certain extent with electricity. Naturally, such circumstances tend to retard the entrance of such animals in metal traps. So that their entrance will not be hindered by this cause, I simply place a piece of cardboard or the like 24 against the inner side of the bottom of the trap. Hence, the bottom is insulated and the animals will enter freely. It may be conveniently mentioned here that in view of the circumstances just described, the frame of the cage 15 is constructed of metal which tends to electrify the animal in the manner described. This is particularly advantageous since as soon as the rat enters the cage and treads on the metal bottom, he will attempt to relieve himself and after passing beneath the pivoted valve or plate 21, he will jump onto the wooden shelf. When on this shelf he will not be troubled by any such electrical current. Of course, when one animal is on the shelf, this makes more room for the entrance of another. Consequently, these are features upon which particular emphasis is to be laid.

In practice, the trap is set as shown in Fig. 1 and the open end thereof is placed against or in spaced relation to a rat-hole. As soon as the pest enters the trap 1 and strikes or in anyway moves the trip 8, the latter automatically becomes disengaged from the roller 7 and permits the forward end of the lever 5 to swing downwardly, the closure 4 being gravity-lowered and thus closing the trap. Seeing that he cannot escape, the animal will be induced to enter the receiving-cage 15 as before described and will seek refuge on the shelf 22. Of course, after he is once in the cage, he cannot escape because of the plate 21. After a catch is made, the trap can be reset to catch other pests. If the cage is full, it can be removed by simply opening the slide 14 and grasping the handle 23. After, or before the cage is removed, the sliding door 20 is closed so as to prevent possible escape of the animals. The cage can then be submerged in a tub of water or the like to drown the rats or they can be removed therefrom and destroyed in any other suitable or desirable way. I am led to state here that by extending the flanges 18 of the cage laterally in the manner described, a tray is provided for collecting dirt which may be made by the animals in the cage. So that the operation of the trap may be continuous, as soon as one cage is removed to destroy animals therein, it is replaced by another empty cage. If desired, no cage at all need be used because the trap is capable of use independent of the cage. As set forth in the aforesaid patent, the mounting means for the trip 8 is such as to permit it to be removed for replenishing the basket with fresh bait.

Although the improved cage and idea has been described in connection with a particular form of trap, I wish to make it understood that the description is not in anyway controlling because the cage may be used in connection with various other types of traps.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. In an animal trap, a compartment having an opening in one side formed by striking the metal inwardly to provide spaced guide flanges for co-action with a cage which is designed to be inserted and removed through said opening, said flanges co-acting with the cage to prevent displacement and to facilitate insertion.

2. In an animal trap, a compartment having an insulated bottom on which the animal is designed to walk, a cage located in said trap and having communication therewith, the cage having a metal bottom and being provided with an internal shelf spaced above said bottom, said shelf being composed of insulation material, as and for the purpose described.

3. In an animal trap, a removable cage designed for disposition in a trap, said cage having opposed sides constructed of screens which are connected to a metal frame, said cage having an opening, a closure for said opening and being equipped with an internal horizontally disposed shelf spaced above its bottom.

4. An animal trap comprising a relatively large trapping compartment having an opening formed in its top by striking the metal inwardly to provide spaced guide flanges, channel guides extending transversely across the top of the compartment on opposite sides of said opening, a sliding closure arranged in said guides, and a cage arranged in said compartment and having its upper end disposed between said flanges, said cage having an inlet opening controlled by a valve which permits entrance of the animal but prevents its escape, said cage being removable through the opening in the top of said compartment.

5. In an animal trap, a removable cage adapted for disposition in a trap, said cage comprising a frame, the side portions of which have their edges directed laterally inward, a pair of vertical guides disposed across the front side of the cage, a door slidable in said guides to close the intake opening in said cage, an inclined valve cooperative with the opening to permit the animals to enter the cage but preventing them from escaping, a horizontal shelf disposed at the center of the cage and having one end terminating in spaced relation from the adjacent side portion of the aforesaid frame to permit passage of the animal through said space.

In testimony whereof I have hereunto set my hand.

JOHN P. SCHUCKMAN.